June 3, 1924.
R. HOFFMAN
FLOUR BIN FOR KITCHEN CABINETS
Filed May 5, 1920
1,496,121
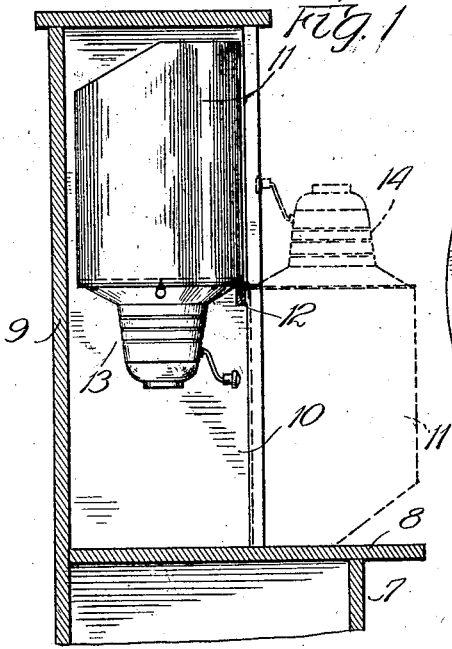
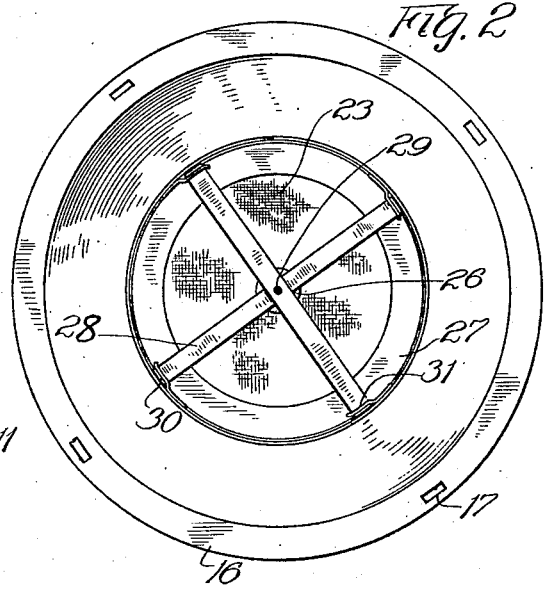
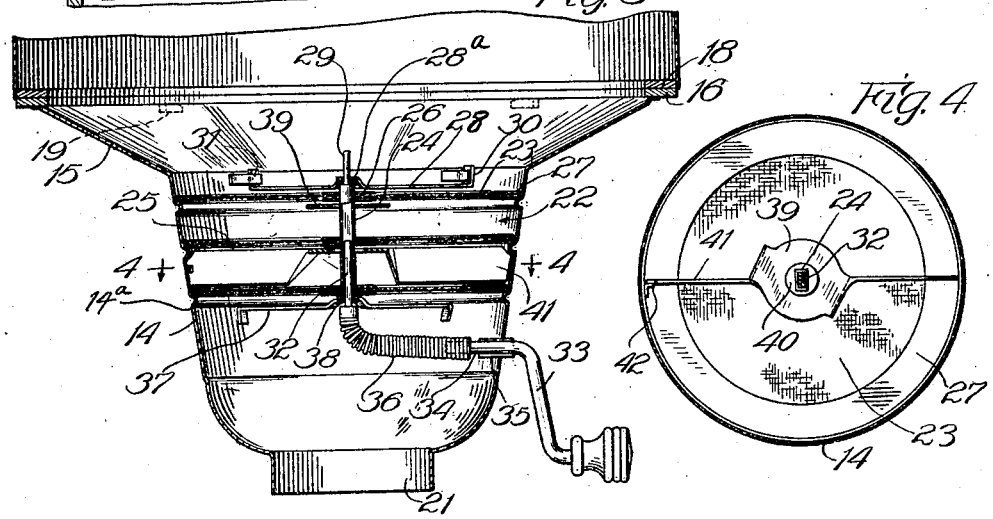
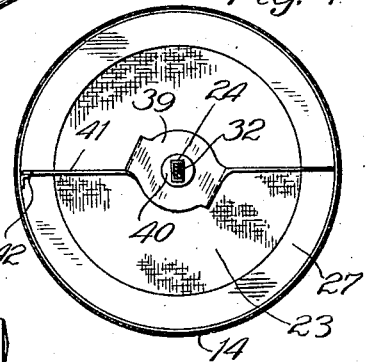
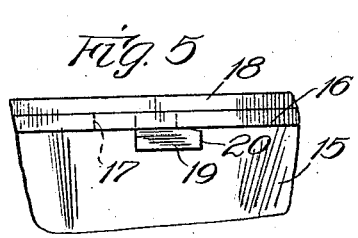
Inventor
Rudolph Hoffman
By Miller Chindall & Parker
Attys Patented June 3, 1924.

1,496,121

UNITED STATES PATENT OFFICE.

RUDOLPH HOFFMAN, OF KANKAKEE, ILLINOIS, ASSIGNOR TO SEARS, ROEBUCK AND CO., OF CHICAGO, ILLINOIS, A CORPORATION OF NEW YORK.

FLOUR BIN FOR KITCHEN CABINETS.

Application filed May 5, 1920. Serial No. 378,984.

*To all whom it may concern:*

Be it known that I, RUDOLPH HOFFMAN, a citizen of the United States, residing at Kankakee, in the county of Kankakee and State of Illinois, have invented certain new and useful Improvements in Flour Bins for Kitchen Cabinets, of which the following is a specification.

This invention relates to flour bins for kitchen cabinets and the like, and has especial reference to the provision of a sifter for the flour bin.

The object of the invention is to provide a sifter of relatively simple and compact construction which is adapted to effect the sifting of the flour in a thorough and efficient manner.

This object of the invention together with other advantages which will be apparent as the description proceeds, is attained by the construction and arrangement illustrated in the accompanying drawings forming part hereof in which Figure 1 is a vertical transverse sectional view through the upper portion of a cabinet having mounted therein a flour bin provided with a sifter which is constructed in accordance with my invention. Fig. 2 is a top plan view of the sifter detached from the bin. Fig. 3 is a central vertical section through the sifter and the lower end of the bin showing details of construction. Fig. 4 is a horizontal section taken on line 4—4 of Fig. 3. Fig. 5 is a fragmentary detail view showing the means for detachably securing the sifter to the bin.

Referring to Fig. 1, 7 designates the lower portion of a kitchen cabinet having a top wall or work table 8, and 9 designates the upper portion having a compartment 10 therein in which is mounted a flour bin 11. Said bin is adapted to contain a relatively large supply of flour to be sifted and is preferably pivotally mounted near its lower forward end upon a support 12 so as to be swingable from its operative position within the cabinet to an inoperative or filling position upon the work table 8. At the lower end of the bin is secured a sifter 13 which is made readily detachable so that when the bin is swung to its inoperative or filling position (shown in dotted lines in Fig. 1), the sifter may be readily removed.

The sifter may comprise an annular casing 14 which is slightly tapered in form. The upper portion 15 of the casing 14 at the base of the bin 11 is funnel-shaped having sharply tapering walls as shown for a purpose which will appear later and is secured upon the under side of a ring 16 which has at spaced intervals, a plurality of slots 17. A similar ring 18 secured at the lower end of the bin 11 has a plurality of depending lugs 19 adapted to enter the slots 17, the lugs having laterally extending portions or shoes 20 adapted to engage with the ring 16 at the ends of the slot 17. It will be seen that only a slight rotation of the sifter with reference to the bin is necessary to effect an attachment or detachment of the sifter with reference to the bin.

At its lower end the casing 14 of the sifter has a discharge opening 21, and substantially centrally of the sifter within the casing 14 is mounted flour sifting means designated generally by the numeral 22. Said sifting means preferably comprises a plurality of foraminated disks 23 (herein 3 in number) rigidly mounted upon a central stem 24, and a plurality of agitators 25 in floating relation one between each pair of disks. Said disks are preferably made of wire screen having central reinforcing plates 26 and peripheral reinforcing rings 27, which are slidably supported by internal annular beads 14ª formed in the casing. At its upper end the stem 24 is mounted in a spider 28 providing a central bearing 28ª for receiving a bearing stud 29 at the upper end of the stem 24. Said spider (Figs. 3 and 4) has the free ends of its arms adapted to be detachably secured to the inner wall of the casing 14. To this end the arms have upturned portions 30, and the casing has secured upon its inner periphery a plurality of straps or fingers 31 for receiving said upturned portions 30. Said fingers are arranged so that a slight rotation of the spider will effect the engagement or disengagement of the spider from the casing.

The stem 24 is preferably made rectangular in form, being made tubular and open at its lower end so as to receive the shank 32 of the actuating means for the sifter. Said means may comprise a handle or crank arm 33 having an inwardly extending portion 34 journaled at 35 in the forward wall of the casing 14. The inner end of the portion 34 of the handle is connected with the operating shank 32 by means of a flexible connection which herein consists of a wire coil 36. The opposite ends of the coil are rigidly secured respectively to the crank arm and the shank. To provide a bearing for the shank 32 a spider 37 may be provided in the casing 14, the free ends of the arms of the spider being rigidly secured to the inner wall of the casing. At their intersection said arms provide a bearing 38 in which the lower end of the shank 32 is adapted to operate.

The agitators 25 may be of any suitable character. Herein they are formed from a single piece of metal shaped to provide a central plate 39, apertured as at 40 to loosely receive the stem 24, and radially projecting blades 41 extending to the inner peripheral surface of the casing. Suitable stop members 42 are preferably provided upon the inner wall of the casing for the purpose of holding the agitators 41 against movement when the disks 23 are rotated in the operation of the crank arm 33.

The operation of the sifter will be apparent from the foregoing description. As the disks 23 are rotated in the operation of the hand crank 33, the agitators are held against movement by the stop members 42 so that the relative movement between the screening and agitating elements will effect a thorough and efficient sifting of the flour. The spider 28, which is positioned above the uppermost screening element or disk 23 assists in causing the flour to be fed to said disk in proper quantities. A certain amount of vibration is always incident to the rotation of the disks. This vibration results in dislodging particles of flour from the interstices of the disks thereby keeping them clean. The parts are compactly arranged so as to consume a minimum amount of space, and the construction is relatively simple and permits of the easy disassembling of the sifting means from the casing 14 when desired by simply turning the spider 28 and lifting the sifting elements out.

The spider 28 serves an additional and rather important function. The large reserve supply of flour stored in the bin is supported thereby and held off the disks excepting, of course, as the flour crumbles and falls as it is continuously undermined by the sifting elements. In this connection, the sharply tapering walls 15 assist very markedly, resulting generally in a sifter which operates very smoothly and easily.

It is to be understood that while the invention is illustrated and described with considerable particularity, it is contemplated that various changes may be made in construction and arrangement without departing from the spirit and scope of the invention as expressed in the following claims.

I claim as my invention:

1. The combination with a flour bin of a flour sifter comprising a casing having its upper end portion adapted for detachable connection with the lower end of the bin, said casing tapering downwardly and inwardly and terminating at its lower end in a discharge opening, a plurality of screening elements and an agitating element, said screening elements being supported at their peripheries upon the inner wall of the casing and in vertically spaced relation and said agitating element being mounted between the screening elements, means for effecting relative rotation between the screening and agitating elements including an axial operating stem, and supports secured to the casing and providing bearings for said stem near its upper and lower ends, the support forming the upper bearing being detachable from the casing to permit the removal of the screening and agitating elements.

2. The combination with a flour bin, of a sifter comprising an annular casing communicating at one end with the flour bin and having a discharge opening at its opposite end, flour sifting means mounted in the casing and comprising a plurality of foraminated disks, an agitator located between each pair of disks, means for rotating the disks, and means for holding the agitators stationary in floating relation in the rotation of the disks.

3. A flour sifter comprising, in combination, an annular casing, an axial stem, a plurality of foraminated disks mounted on the stem, a plurality of floating agitators stationarily mounted in the casing adjacent said disks, an operating member connected with the stem, and means for actuating said member.

4. A flour sifter comprising, in combination, an annular casing, an axial stem, a plurality of foraminated disks mounted on the stem, a plurality of agitators stationarily mounted in the casing adjacent said disks, said stem having a socket in its lower end, an operating shank adapted to enter said socket, a crank having a portion journaled in the side wall of the casing radially thereof, and a flexible connection between said radially extending portion of the crank and said shank.

5. In combination with a flour bin, a flour sifter detachably mounted at the lower end of the flour bin and comprising a casing, sifting means mounted in said casing and including screening and agitating elements, an axial stem carrying said elements, means detachably secured to the casing to provide a bearing for the upper end of said stem, means stationarily mounted in the casing to provide a bearing for the lower end of said stem, and means for rotating one of said elements, the other one of said elements being held against movement in floating relation in the casing but adapted to be removed therefrom.

6. A flour sifter comprising, in combination, an annular casing, an axial stem, a plurality of screening elements in the form of disks mounted upon said stem and having reinforcing rings on their peripheries slidably supported by the casing, a plurality of agitating elements held against movement in the casing, and means for rotating the screening elements.

7. In a flour sifting device the combination with a flour bin and a sifting element adapted to be disposed at an aperture at the base of said bin, of means to support the bulk of the flour in said bin off said sifting element comprising sharply tapering walls inclining toward said aperture.

8. A device of the class described comprising a flour bin having an unsifted-flour-discharge opening, an annular sifter casing detachably secured to said bin and disposed at said opening, said casing having slightly tapering walls terminating in a sifted-flour-discharge opening, annular ribs formed in the walls of said casing, foraminated disks mounted in vertically spaced relation in said casing, of increasing diameter from the lowermost to the uppermost, reinforcing peripheral rings on said disks adapted to rotate on said ribs, floating agitators between said disks, stops for said agitators to prevent continuous rotation thereof, a central stem for operating said disks, having said disks mounted thereon, means for turning said stem, a fixed support for the lower end of the stem, and a detachable support for the upper end of the stem disposed at the unsifted-flour-discharge opening between said bin and said sifter casing.

9. A device of the class described comprising a flour bin, sharply tapering walls at the base of said bin defining an unsifted-flour-discharge opening, an annular sifter casing disposed at said aperture, foraminated disks mounted within said casing, stationary agitators between said disks, means for rotating said disks, and a detachable support therefor disposed at the unsifted-flour-discharge opening between said bin and said sifter casing, said support being adapted to constitute with the tapering walls at the base of said bin supporting means for the flour in said bin to hold the bulk thereof off said sifting element.

10. A device of the class described comprising a flour bin having an unsifted-flour-discharge opening, a sifter casing disposed at said opening, foraminated disks mounted in vertically spaced relation in said casing, stationary floating agitators between said disks, means for rotating said disks, and a detachable support therefor disposed at the unsifted-flour-discharge opening above said disks adapted to support the flour in said bin and to hold the bulk thereof off said sifting element.

11. In a kitchen cabinet, a compartment open at its forward side, a flour bin mounted to swing on a horizontal axis located near the forward central portion of the compartment whereby the bin is swingable from a normal position within the compartment to an inverted position forwardly of the compartment, said bin having detachably secured at its normal lower end a flour sifter whereby when the bin is inverted the sifter may be removed to permit of the filling of the bin.

12. In a kitchen cabinet, the combination with a compartment and a work table at the lower forward edge of the compartment, a flour bin mounted within the compartment to swing on a horizontal axis from a normal position within the upper portion of the compartment to an inverted position forwardly of the compartment with its lower end resting upon said work table, said bin having at its normal lower end a flour sifter detachably secured thereto with a discharge opening positioned a substantial distance above the bottom of the compartment.

In testimony whereof, I have hereunto set my hand.

RUDOLPH HOFFMAN.